United States Patent [19]

Irwin

[11] 4,120,683
[45] Oct. 17, 1978

[54] FUNNEL ARM OPERATING MECHANISM

[75] Inventor: George W. Irwin, Holland, Ohio

[73] Assignee: Owens-Illinois, Inc., Toledo, Ohio

[21] Appl. No.: 820,656

[22] Filed: Aug. 1, 1977

[51] Int. Cl.² ............................ C03B 5/30; C03B 9/40
[52] U.S. Cl. ...................................... 65/207; 65/225; 65/304; 65/323
[58] Field of Search ................. 65/361, 225, 323, 304, 65/207

[56] References Cited

U.S. PATENT DOCUMENTS

| | | | |
|---|---|---|---|
| 3,338,699 | 8/1967 | Colchacuff et al. | 65/361 X |
| 3,374,079 | 3/1968 | Daly | 65/323 X |
| 3,383,193 | 5/1968 | Bailey | 65/323 X |
| 3,597,185 | 8/1971 | Jones | 65/225 X |
| 3,672,860 | 6/1972 | Keller | 65/225 X |

Primary Examiner—S. Leon Bashore
Assistant Examiner—Frank W. Miga
Attorney, Agent, or Firm—D. T. Innis; M. E. Click; D. H. Wilson

[57] ABSTRACT

In apparatus for molding glass into hollow-shaped articles such as glass containers, glass charges are delivered to a parison mold wherein the glass is shaped either by a plunger or by a counterblow within the parison mold. The charge of glass that is delivered to the parison mold is guided into the mold by a superimposed funnel. The funnel is alternately moved into and out of position at the open, upper end of the parison mold to effect the guiding of the charge. The mechanism for moving the funnel on a conventional I.S. machine must be capable of moving the funnel from an upper, radially displaced position, to a lower, seated position concentric with the mold. The operation of the funnel seating motion is accomplished by the use of a generally reciprocable, fluid-operated motor in which a funnel-carrying arm is fixed to the piston rod of the motor and the rod is turned about its vertical axis during its upward and downward movement. The control of the fluid supplied to the motor and the exhaust of fluid from the motor is such that the rate of movement may be closely adjusted and controlled. The entire operating mechanism is mounted on what is termed the "section box" of the I.S. machine. For convenience of repair and adjustment, the fluid motor is mounted to the upper end of the piston rod, with the piston rod extending vertically downward. Intermediate its length, the funnel arm is fixed to the piston rod. The rod is turned about its vertical axis by a cam roller, carried by the arm, moving in a fixed cam slot. The lower end of the piston rod is guided within a fixed bushing and the upper end of the mechanism is held steady by a bracket.

6 Claims, 5 Drawing Figures

FUNNEL ARM OPERATING MECHANISM

BACKGROUND OF THE INVENTION

In the operation of the conventional parison mold portion of an I.S. machine, such as shown in U.S. Pat. No. 1,911,119, FIGS. 4 and 15, the funnel arm numbered 57 was carried adjacent the upper end of the rod 63 driven by the piston cylinder 67 and the lower end of the rod was enclosed in a housing that carried a cam slot 77 and the lower end of the rod carried the follower 76. When the I.S. machine was equipped to handle single cavity forming, that is, a single gob was fed to a single cavity parison mold, the funnel arm operating mechanism was sufficiently strong to carry the arm without undue vibration or deflection. Funnel arm operating systems at the present time, require sufficient strength and rigidity in their motion to handle double and triple gob guiding functions where two or three charges or gobs are dropped simultaneously and are guided by the funnels into the triple or double cavity parison molds. These funnels are required to be moved with speed and accuracy. This mechanism advantageously should be capable of easy accessibility for replacement of parts which may become worn. When changing molds at the parison forming station of an I.S. forming machine, the upper or open end of the molds through which the charge will be delivered may change in relative height with respect to the level of the section box. The position of the funnel arm, when in its lowermost position, must be carefully monitored so that excessive wear between the funnels and molds will not occur.

SUMMARY OF THE INVENTION

Improved funnel operating mechanism for a glass forming machine in which the drive motor piston rod which carries the funnel arms is guided by a lower bushing, the upper end of the rod being connected to the piston motor and a radially extending cam follower, carried by the rod, and the radially extending funnel arm are in close proximity on the rod, such that movement of the funnel arm is positively controlled by the movement of the cam follower following a cam track,

Figure 1:
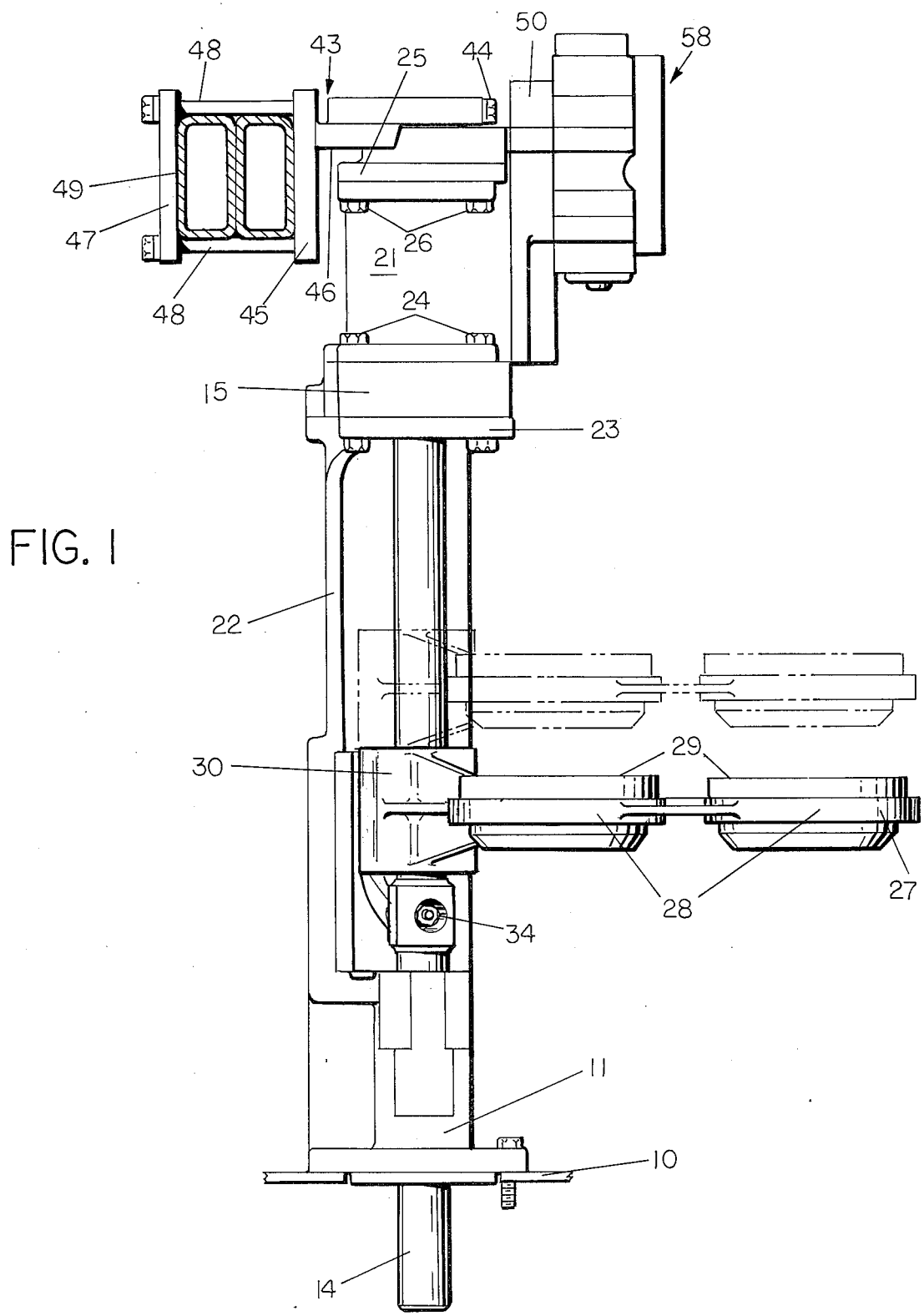
FIG. 1 is a side elevational view of the apparatus of the invention.

With particular reference to FIG. 1 and, as background from the above-referred-to Ingle U.S. Pat. No. 1,911,119, the detailed description of the invention will be given.

It should be understood that the present apparatus is that which is used to move a funnel arm into and out of vertical alignment with the upper, open end of a parison mold in a typical I.S. Glass Forming Machine. The apparatus of the invention is adapted to be mounted to the upper surface of what is termed the "section box" of the I.S. Machine. In the above-referred-to Ingle patent, the section box carries the reference numeral 9 and is described as a box-like base forming a plenum chamber for the cooling air.

Figure 3:
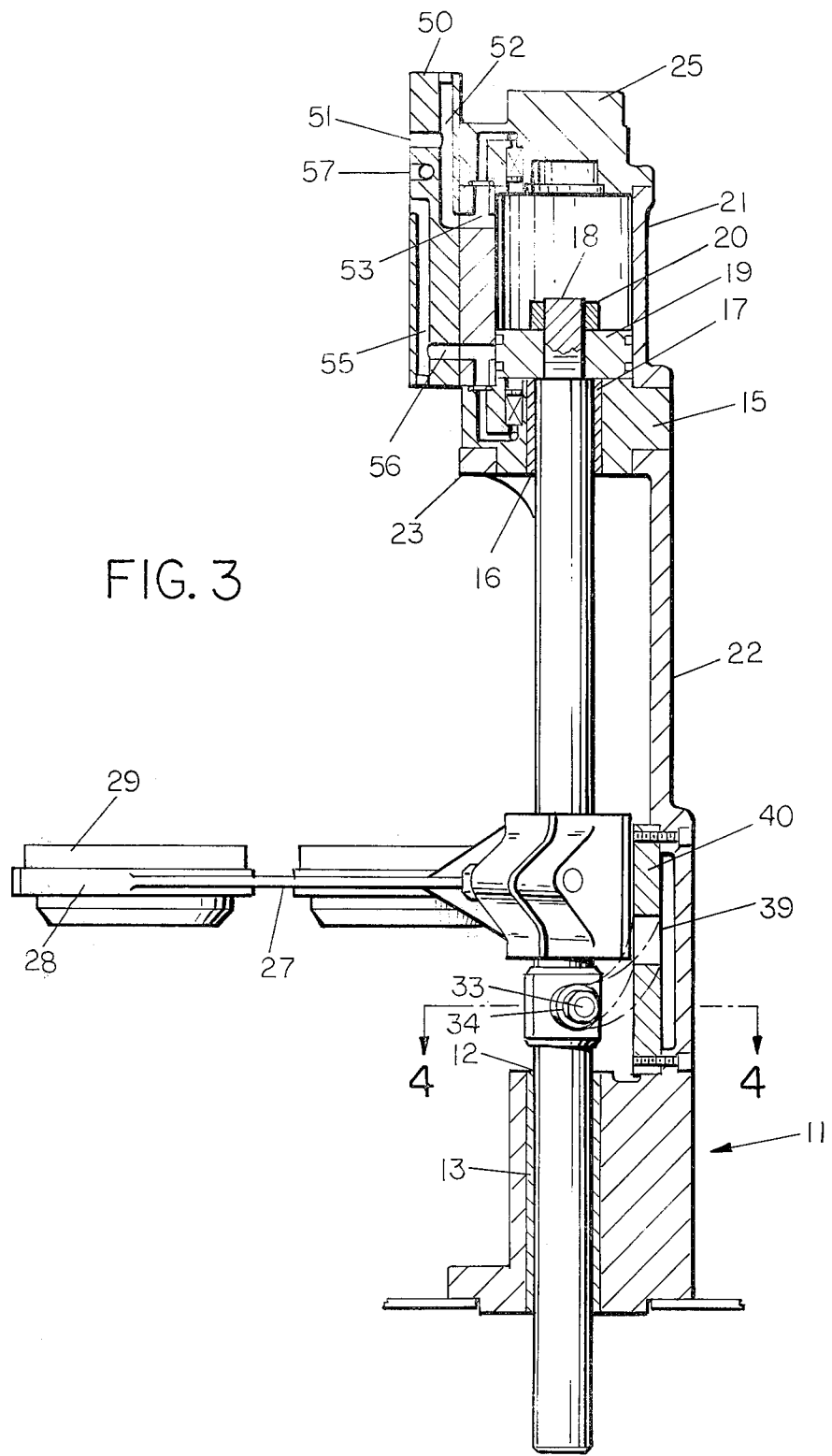
FIG. 3 is a cross-sectional view taken at line 3—3 of FIG. 2.

With reference to FIGS. 1 and 3, a top surface 10 is comparable to the upper surface of the "section box" disclosed in the Ingle patent. To the surface 10, a vertically extending casting 11 is bolted. The lower end of the casting 11 is provided with a vertical passage 12 within which a cylindrical bushing 13 is positioned. Within the bushing 13 is positioned a piston rod 14. The piston rod 14 extends upwardly and passes through a lower, piston motor, head 15. The head 15 has a vertical passage 16 formed therein within which sealing bushing 17 is positioned and the upper end of the rod 14 extends through this bushing 17. The upper end of the rod 14 is provided with a reduced cross-sectional portion 18 which serves as a mounting member for a piston 19. The piston 19 is mounted to the portion 18 by a threaded nut 20. The piston 19 is surrounded by a motor cylinder 21.

The casting 11 has a vertically extending intermediate portion 22 and an upper, horizontally extending portion 23. The portion 23 has a generally circular opening therein within which the piston motor head 15 seats and the cylinder 21 and portion 23 of the casting 11 are bolted to the head 15 by bolts 24. In this manner, the cylinder 21 which, in effect, along with the head 15 and a cap 25, constitute the motor within which the piston 19 is reciprocated. Again, the cap 25 is bolted at 26 to the upper end of the cylinder 21.

The casting 11, as best seen in FIGS. 1 and 3, is generally open along one side and only extends part-way about the axis of the rod 14. This intermediate portion 22 is structurally strong enough to accomplish its purpose and is provided with the open side so that a funnel arm 27 may extend radially outward from the piston rod and be moved through an angle of approximately 60° between its extremes of elevated and depressed positions. The funnel arm 27 is formed with a pair of ring-like members 28, which actually are essentially one casting. The ring-like members 28 each carry an annular funnel 29. The arm 27 is cast with a generally cylindrical bushing 30, with the bushing 30 being clamped to the rod 14 by any suitable means, it being understood that it is clamped to the rod 14 in such a manner that it may be adjusted radially and relative to its position along the axis of the rod 14.

Figure 4:
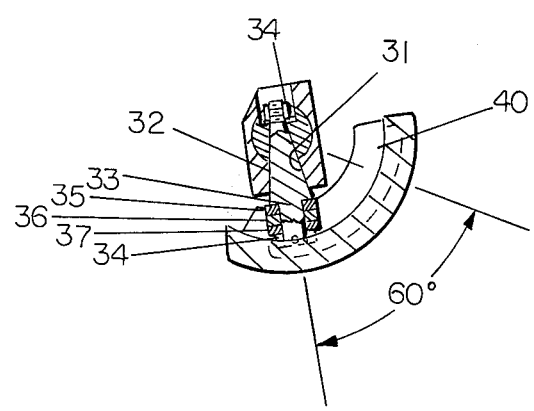
FIG. 4 is a cross-sectional view of the cam and follower taken at line 4—4 of FIG. 3.

In close proximity to, and below the bushing 30, the rod 14 is provided with a horizontally extending passage 31. As can best be seen in FIG. 4, this passage 31 takes the form of a conically tapered passage within which a truncated cone-shaped end 32 of a horizontal shaft 33 is mounted. The truncated end 32 of shaft 33 is held in the passage 31 by a threaded bolt 34 whose head is shown as slightly counter-sunk within the rod 14. The end of the shaft 33, opposite the bolt 34, is cylindrical and has mounted thereon three cam follower rollers 35, 36 and 37. These rollers are retained on the shaft 33 by a retaining nut 38; however, the rollers are not tightly fixed relative to each other so that they may independently rotate. The rollers 35–37 extend into an opening 39 in a cam plate 40.

The cam plate 40, as best seen in FIG. 3, has the configuration of a generally semi-cylindrical member having a vertically extending lower slot portion 41 blending into a curved slot portion 42. With this configuration of a slot, it can be seen that upon vertical reciprocation of the piston rod 14, the cam follower riding in the slot of the cam plate 40 will cause rotation of the piston rod about its longitudinal axis. The vertical portion 41 of the slot is necessary in order to permit the bottom of the funnel 29 to be lifted from the upper, open end of the parison mold and the curved portion 42 assures the swinging movement of the funnel arm 27 through an angle of approximately 60° which will provide complete clearance of the funnel arm from the upper area of the parison mold. This clearance is necessary so that a baffle may be seated in the open, upper end of the parison mold prior to the formation of the parison within the mold.

With particular reference to FIG. 1, the funnel arm 27 is shown in the seated or down position. However, in FIG. 3, while the funnel arm 27 is in its actual physical position for this view, the cam plate 40 and the cam follower rollers 35–37 and supporting shaft 33 are shown in phantom line to illustrate the configuration of the slot and relative positions of the plate 40 and follower when the piston 19 is in its lowermost position.

The upper portion 22 of the vertical casting supports the motor cylinder 21 and its head 15. The cap 25 is steadied with a two-piece horizontal clamp 43 with bolts 44 extending horizontally through one-half of the clamp 43 and into the left-hand half of the clamp. A bracket 45 having a generally horizontally extending portion 46 may be fastened to the clamp 43. The bracket 45, in cooperation with a plate 47 is clamped by bolts 48 to a dual, manifold beam 49 which extends the length of the plural sections of the machine. In this manner the upper end of the motor and the casting on which it is mounted is held against vibration and movement as the result of the operation of the funnel arm driving system.

Figure 2:
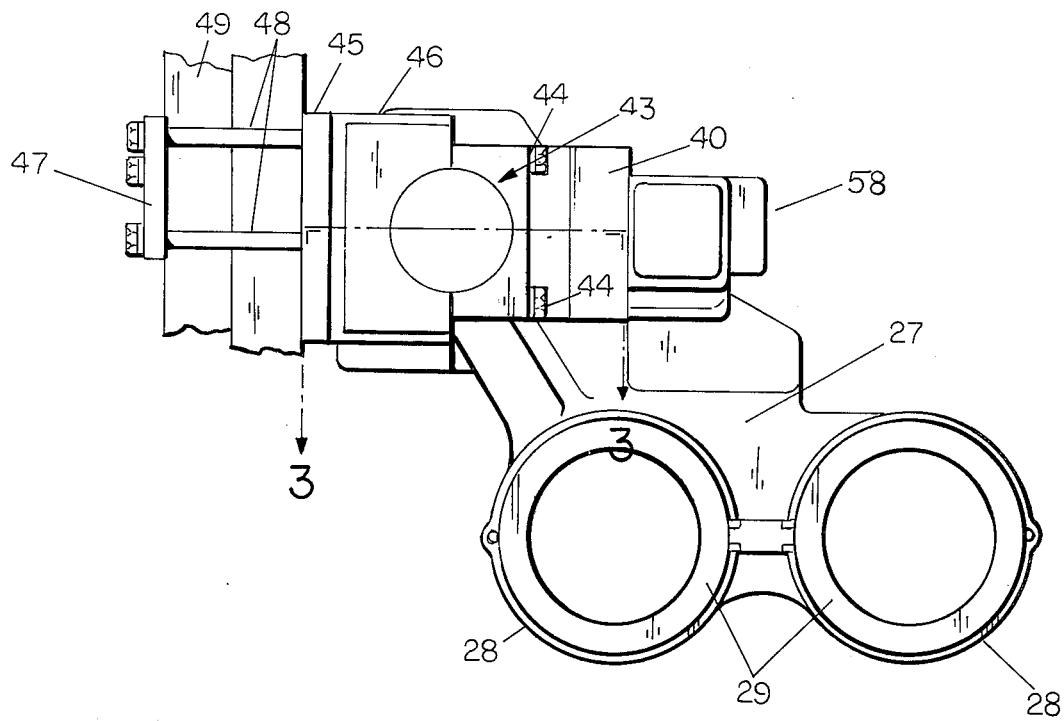
FIG. 2 is a top plan view of the apparatus of FIG. 1.

To the right-hand side of the cylinder 21, as viewed in FIGS. 1 and 2, a manifold plate 50 is mounted. The manifold plate 50 has three ports, as best seen in FIG. 3. An upper port 51 communicates through passages 52 and 53 to the upper end of the cylinder 21. A lower port 54 communicates through passages 55 and 56 to the lower end of the cylinder 21 and the lower piston head 15. A middle port 57 is a port through which the operating fluid supply is introduced.

Figure 5:
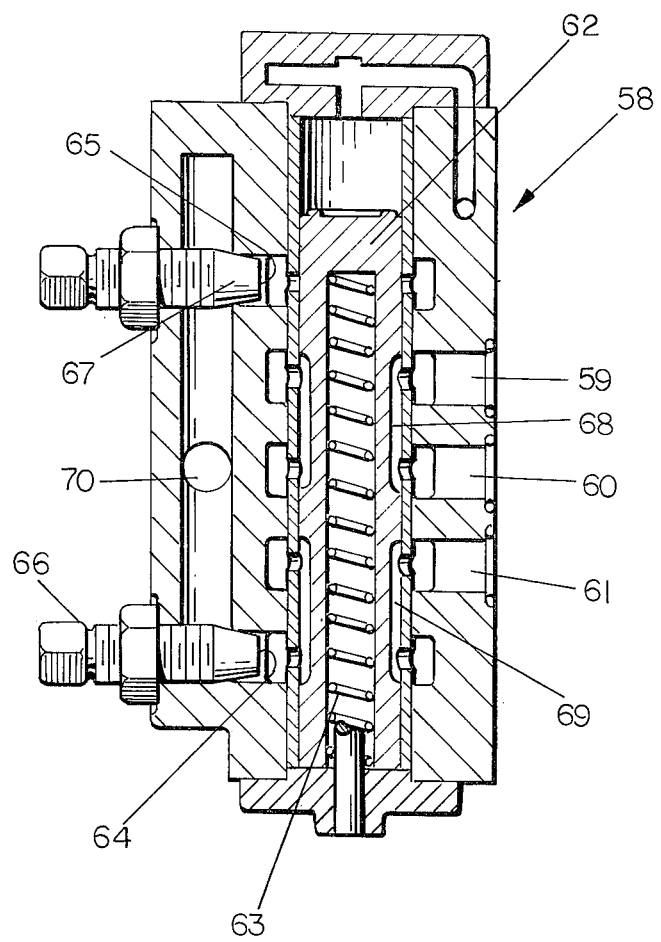
FIG. 5 is a cross-sectional view of the control valve of FIG. 1 on an enlarged scale.

A control valve 58 is provided to control the up and down movement of the piston motor 21 and the valve is shown in detail in FIG. 5. The cross-section of the valve 58, shown in FIG. 5 will, on an enlarged scale, match with the manifold 50, as shown in FIG. 3. A port 59 will match with the port 51 and ports 60 and 61 will match with ports 57 and 54 respectively of the manifold 50. The valve 58 generally takes the form of a spool valve having a central spool 62 therein which is spring-biased by a spring 63 in the upward direction and may be actuated to the position shown in FIG. 5 by the introduction of air under pressure to the upper end of the spool guiding chamber. The valve 58 is provided with a pair of exhaust passages 64 and 65 within which adjustable throttle valves 66 and 67 are positioned. With the valve in the position shown in FIG. 4, supply air will enter through port 60, pass by way of an undercut portion 68 of the spool 62 to the port 59, then through the port 51 and passageways 52 and 53 to the upper end of the cylinder 21. Air, which was below the piston 19 as it traveled downwardly, will be forced through the passageways 56 and 55 through the port 54 into the port 61 of the valve 58. This air entering the port 61 will, by way of an undercut portion 69, enter the exhaust passage 64 and be throttled by the throttle valve 66 and then pass to an exhaust port 70. As can readily be seen, when pressure is relieved from the upper end of the valve spool 62, it will move upward causing a reversal in the supply of air, to effect the upward movement of the piston 19 and the consequent exhausting of air which is trapped above the piston through the throttle valve 67. These throttle valves 66 and 67 are set to effect a control over the rate at which the funnel arm mechanism is to be operated in each of its two directions, up or down.

I claim:

1. In apparatus for forming hollow glass articles in which a parison forming mold is supplied with a charge of glass through the open, upper end of the parison mold and wherein the charge is guided by a funnel seated on the parison mold to guide the charge thereinto prior to forming the parison therein and the formed parison is then transferred to a blow mold where the parison is expanded into the final article shape, the improvement in the funnel-operating mechanism comprising:

a parison mold positioned at a parison station;
a vertically extending casting mounted adjacent said parison mold and supported by a section box;
a cylindrical fluid motor having a top and closing cap mounted to the upper end of said motor;
a vertical passage formed in the upper portion of said casting and a coaxially aligned passage formed in the lower portion of said casting, said passages being in coaxial alignment;
cylindrical bushings mounted in said passages formed in the casting;
a vertically movable piston within said fluid motor;
a downwardly extending piston rod connected to said piston and extending downwardly through said cylindrical bushings;
a semi-cylindrical cam plate connected to said casting intermediate the cylindrical bushings and spaced from said downwardly extending piston rod;
a radially extending cam follower connected to said piston rod, said follower engaging said cam plate;
a radially extending support arm fixed to said rod, said support arm being fixed to said rod immediately above the location of said cam follower, said arm supporting guide funnels;
a fixed support beam extending adjacent the upper end of said motor; and
bracket means connected to, and extending between, said beam and the upper end cap of said motor to effectively immobilize the upper end of said motor.

2. The apparatus of claim 1 further including manifold means mounted on said motor in communication with the fluid connections to said motor, and a fluid control valve connected to said manifold for regulating the supply of fluid to said motor and control the rate of movement thereof.

3. The apparatus of claim 1 wherein said curved cam plate is mounted on said casting in facing relation to the open side of said casting, and said cam plate is formed with a cut-out slot as the cam.

4. The apparatus of claim 3 wherein said radially extending follower spans the gap between said piston rod and said cut-out slot.

5. The apparatus of claim 4 in which said cam follower comprises a horizontal arm and a plurality of independently rotatable rollers carried thereby which ride in the cut-out slot in said cam plate.

6. The apparatus of claim 5 wherein said cam slot describes a curve extending approximately 60° in the horizontal about the axis of the piston rod.

* * * * *